US010897887B1

(12) United States Patent
Walsh et al.

(10) Patent No.: US 10,897,887 B1
(45) Date of Patent: Jan. 26, 2021

(54) REMOTE SENSING RODENT BAIT STATION TRAY

(71) Applicant: Bell Laboratories, Inc., Madison, WI (US)

(72) Inventors: James R. Walsh, Wauwatosa, WI (US); Patrick J. Lynch, Fort Lauderdale, FL (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

(21) Appl. No.: 16/659,379

(22) Filed: Oct. 21, 2019

Related U.S. Application Data

(60) Provisional application No. 62/748,640, filed on Oct. 22, 2018.

(51) Int. Cl.
| | |
|---|---|
| *A01M 31/00* | (2006.01) |
| *A01M 23/16* | (2006.01) |
| *H01Q 9/16* | (2006.01) |
| *H04Q 9/00* | (2006.01) |
| *G01V 3/08* | (2006.01) |
| *A01M 25/00* | (2006.01) |

(52) U.S. Cl.
CPC .......... *A01M 31/002* (2013.01); *A01M 23/16* (2013.01); *G01V 3/08* (2013.01); *H01Q 9/16* (2013.01); *H04Q 9/00* (2013.01); *A01M 25/004* (2013.01); *H04Q 2209/40* (2013.01); *H04Q 2209/75* (2013.01); *H04Q 2209/88* (2013.01)

(58) Field of Classification Search
CPC .... A01M 31/002; A01M 23/00; A01M 23/02; A01M 23/16; A01M 25/00; A01M 25/002; A01M 25/004; A01M 1/026; G01V 3/08; H01Q 9/16; H04Q 9/00; H04Q 2209/00; H04Q 2209/40; H04Q 2209/43; H04Q 2209/50; H04Q 2209/75; H04Q 2209/80; H04Q 2209/84; H04Q 2209/88

See application file for complete search history.

(56) References Cited

U.S. PATENT DOCUMENTS

| | | | |
|---|---|---|---|
| 6,937,156 B2 | 8/2005 | Gardner, Jr. et al. | |
| 8,793,929 B1 | 8/2014 | Walsh et al. | |
| 9,532,564 B1* | 1/2017 | Walsh | A01M 25/002 |
| 9,950,238 B2* | 4/2018 | DeAngelis | H04W 4/023 |
| 10,548,308 B2* | 2/2020 | Howard | A01M 31/002 |
| 2018/0199565 A1 | 7/2018 | Zosimadis | |
| 2018/0235205 A1 | 8/2018 | Howard et al. | |
| 2018/0301018 A1 | 10/2018 | Seifer et al. | |
| 2018/0325093 A1* | 11/2018 | Vickery | A01M 23/18 |

FOREIGN PATENT DOCUMENTS

WO    2017208068 A1    12/2017

* cited by examiner

*Primary Examiner* — Franklin D Balseca
(74) *Attorney, Agent, or Firm* — Stiennon & Stiennon (57) ABSTRACT

A rodent bait station has an electronic sensor module protected within a sealed receptacle beneath a tray bottom wall. A threshold is defined by walls on the upper side of the tray. A rodent must pass over the threshold to reading a feeding portion of the tray which supports rodent bait. The sensor module has a capacitance sensor urged against the bottom wall of the tray and which detects the passing of a rodent into the feeding area. The incidence of the rodent is logged and made available to a device exterior of the tray.

20 Claims, 7 Drawing Sheets

REMOTE SENSING RODENT BAIT STATION TRAY

CROSS REFERENCES TO RELATED APPLICATIONS

This application claims priority on U.S. provisional App. No. 62/748,640, filed Oct. 22, 2018, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

Bait stations have long been used to keep nontargeted species and humans away from poison bait or traps. Bait stations can be used for this purpose in homes, restaurants and other businesses, but they have particular utility in commercial settings involving the storage or use of edible commodities or products. To minimize the risk of rodents becoming established, a relatively large number of bait stations may be deployed throughout the facilities. The bait stations may first be baited with non-toxic bait, which may contain a florescent dye which causes rodent droppings and urine to fluoresce in ultraviolet light so that the presence of rodents can be more readily detected. After deployment, the bait stations are repeatedly checked and, in the event that a bait station is found to have been visited, the non-toxic bait is replaced with poison bait. This process minimizes the amount of poison bait to which the environment, nontargeted species, and humans are exposed. However, use of nontoxic bait may call for frequent visits to each bait station to quickly determine which bait stations are being visited. Any significant delay in discovering the presence of rodents means that the bait stations have become feeding stations which encourage the proliferation of the rodents. Thus, near doily checking of every bait station may be required. For early detection, it is often necessary to unlock and open each bait station, determine if the bait station has been visited, and then reclose the bait station. Thus, there can be a tension between using only non-toxic bait until visitation by a rodent to a particular bait station has been determined, and the cost of frequent monitoring which this may require. If all bait stations are baited with poison bait it is only necessary to check the bait stations on a frequency sufficient to rebait the stations before all the bait is consumed. At the same time, less frequent visits to the bait stations will generally mean that the external signs of visitation i.e., florescent signs or droppings will be apparent, before it is necessary to open and assess the situation within the bait station. Frequent assessment is beneficial even when poison bait is used, for example, so that the deployment of bait can be augmented by additional bait stations, or openings can be sealed or access to food otherwise cut off. However, if poison bait is always used the rodent population is being controlled even if more frequent checking of the bait stations might provide more optimal control. If no poison bait is deployed or when it is deployed in only some of the bait stations, the importance of continuous monitoring becomes paramount, with attendant higher labor cost. Often a card within each bait station is used to log the periodic visits to the deployed bait stations to be sure that every bait station has been visited in accordance with the protocol selected for a deployment site.

What is needed is a cost-effective bait station which incorporates electronic monitoring and logging.

SUMMARY OF THE INVENTION

Electronic monitoring is achieved by a sensor module sealed within a bait tray which senses the presence of a rodent as it passes over the sensor module. The sensor module technology employs a standard FR4 printed circuit board (PCB) on which is attached a conductive plate forming a capacitance sensor which is positioned beneath a threshold over which the rodent must pass to access the bait. On the same PCB are mounted a Bluetooth chip set, an antenna, a power supply comprising one or more long life lithium cells, a controller with programmable functionality, and a circuit which detects a change in the capacitance of the conductive plate. A capacitance sensor can sense through plastic and can sense all types of material, including rodents. Thus, the sensor module containing the capacitance sensor can be sealed from the environment within a plastic case forming a part of the bait tray.

When the capacitance sensor detects a signal indicative of a rodent passing over the conductive plate the passage is logged with a time and date stamp, and the signals so detected are gated such that only a single detection is reported within a given timeframe, for example 30 minutes. When an external Bluetooth communication link, such as that provided by a smart phone running an app, interrogates the sensor module, the module communicates the contents of the log to the smart phone. The log contents may simply indicate whether the station has been visited or not, and includes the times, if any, when the bait station was visited. Each sensor module has a unique identifier, so the app can keep track of all the bait stations deployed and provides such functionality as indicating when a signal has been received from all bait stations at a particular location and displaying a map to any bait stations which have been visited. Depending on the bluetooth transceiver power and the sensitivity of the sensor module and of the smart phone, the sensor module may require the pest control technician to traverse within a certain distance of each bait station. In other circumstances the sensor module may have sufficient range that it is sufficient simply to travel to various deployment areas which can be checked without walking the line along which the bait stations are deployed. In either case the substantial effort in opening every station, determining the status of the bait, and logging the presence and status of the bait stations no longer needs to be done manually by the pest control operator.

The core of the invention is a plastic bait tray having one or more trap or bait receptacles. The plastic tray is arranged generally with the cooperation of structures forming the bait station lid, to form a restricted path to the bait. An approach portion of the tray has a restricted path which includes an upwardly open support surface forming part of an upper surface of the tray over which a rodent must travel to reach the bait. On the underside of the tray a receptacle is formed integral with the tray. The tray has a bottom wall forming a portion of the receptacle, and a peripheral wall surrounding the bottom wall. The peripheral wall extends a short distance downwardly from the bottom wall and terminates in a bottom edge having a downwardly opening groove. A receptacle lid has a tongue which fits in the groove and is sealed to the peripheral wall bottom edge by ultrasonic welding.

The tray bottom wall has, as viewed from below, a downwardly protruding portion which extends beneath and across the restricted path over which a rodent must travel to reach the bait. Extending downwardly from the protruding portion are at least two pins or structures which position the capacitance sensor against the bottom wall protruding portion. The bottom wall has a cavity for receiving a dipole Bluetooth antenna which extends from the PCB of the sensor module, and a depression which supports two button CR2450 lithium primary cells. The PCB board is supported to engage the conductive plate forming the capacitance sensor with the protruding portion.

The receptacle lid has a portion of foam tape attached to an inside surface which engages the sensor module PCB underlying the conductive plate forming the capacitance sensor and urges it upwardly against the tray bottom wall within the downwardly protruding portion. The tape serves to clamp the conductive plate against the bottom wall protruding portion and directly below and across the restricted path support surface over which a rodent must travel to reach the bait.

It is an object of the present invention to provide a rodent bait station assembly configured to accept an electronics package which detects the entry of rodents and communicates with a pest control operator.

It is a further object of the present invention to provide a tray for a rodent bait station which effectively supports an electronic sensor for communicating with a monitor outside the bait station.

Further objects, features and advantages of the invention will be apparent from the following detailed description when taken in conjunction with the accompanying drawings.

DESCRIPTION OF THE PREFERRED EMBODIMENTS

Figure 1:
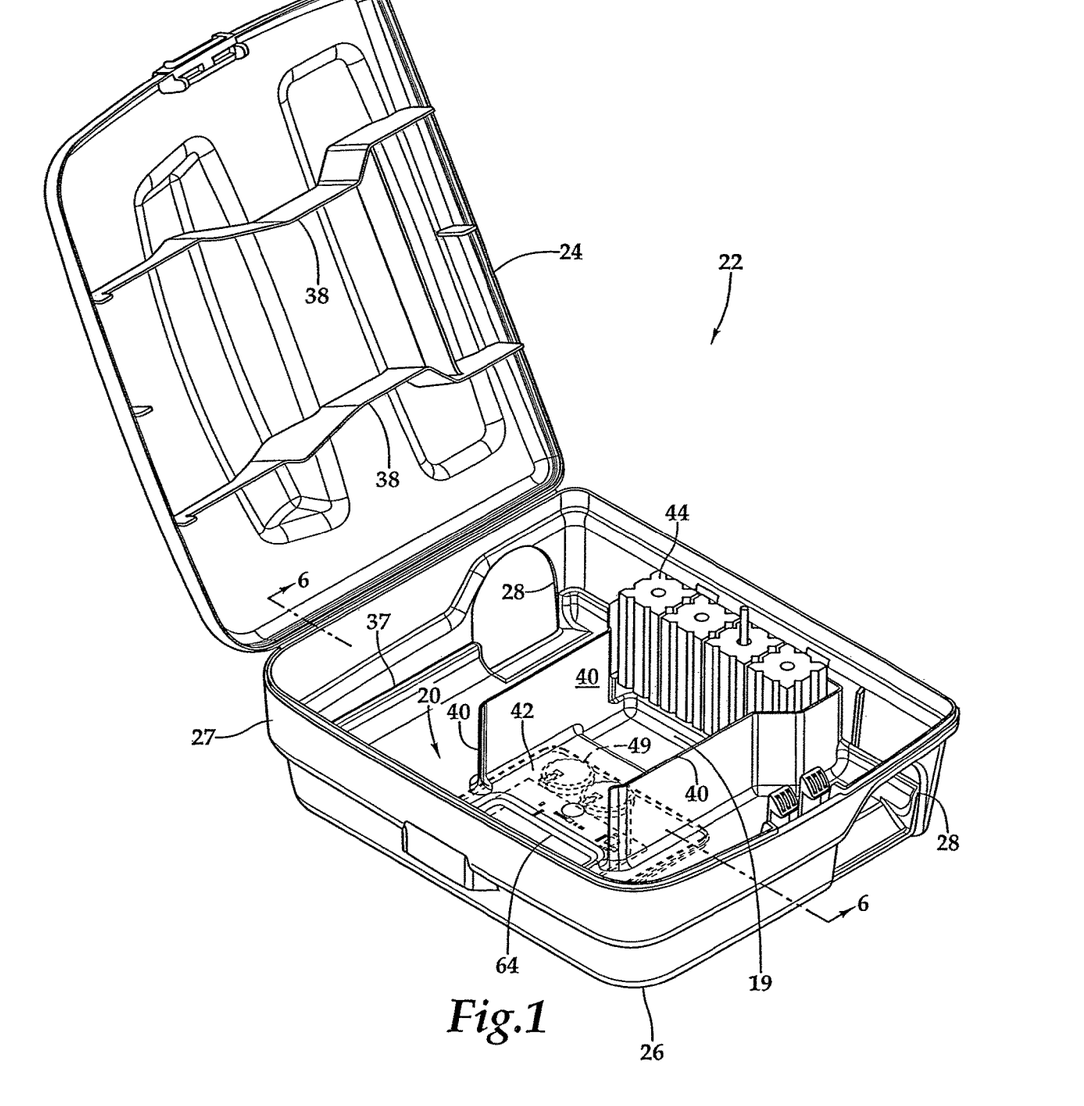
FIG. 1 is an isometric view of a bait station with a bait tray which incorporates an electronic module.
Figure 2:
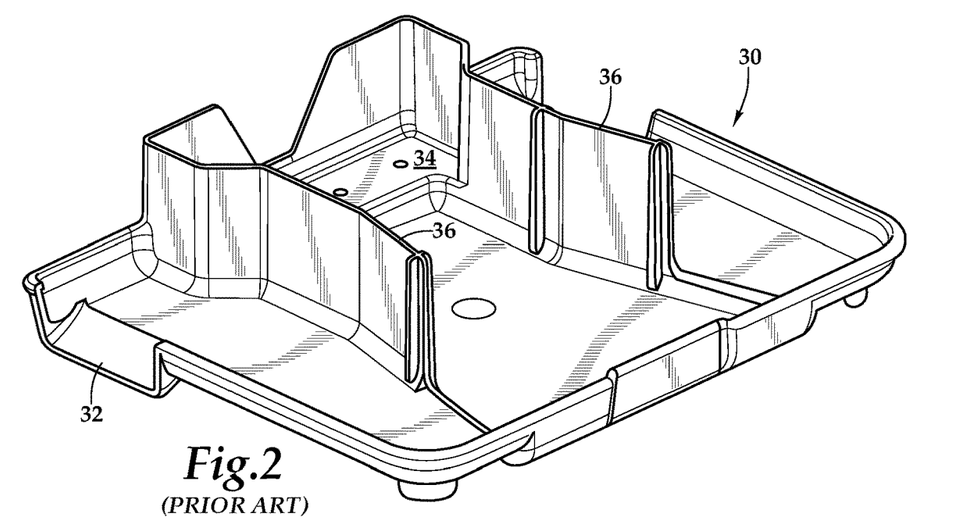
FIG. 2 is an isometric view of a prior art bait tray which does not incorporate an electronic module.
Figure 3:
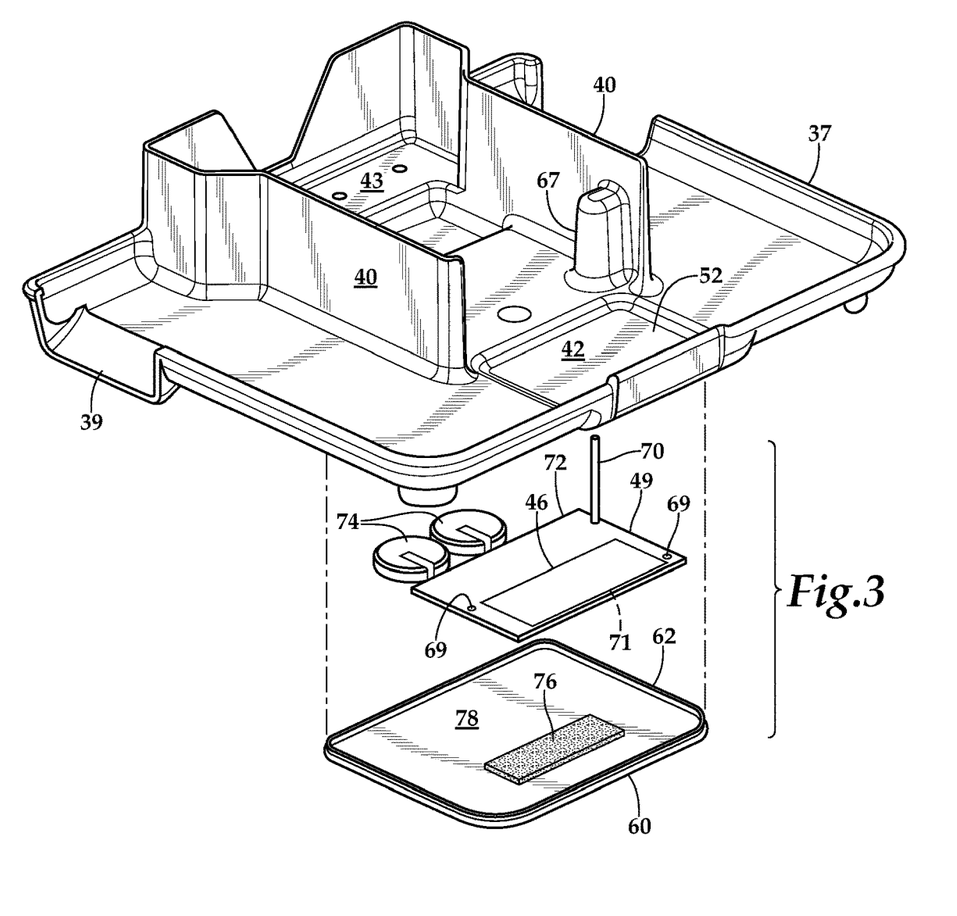
FIG. 3 is an exploded isometric view of the bait tray of FIG. 1 which incorporates an electronic module.
Figure 4:
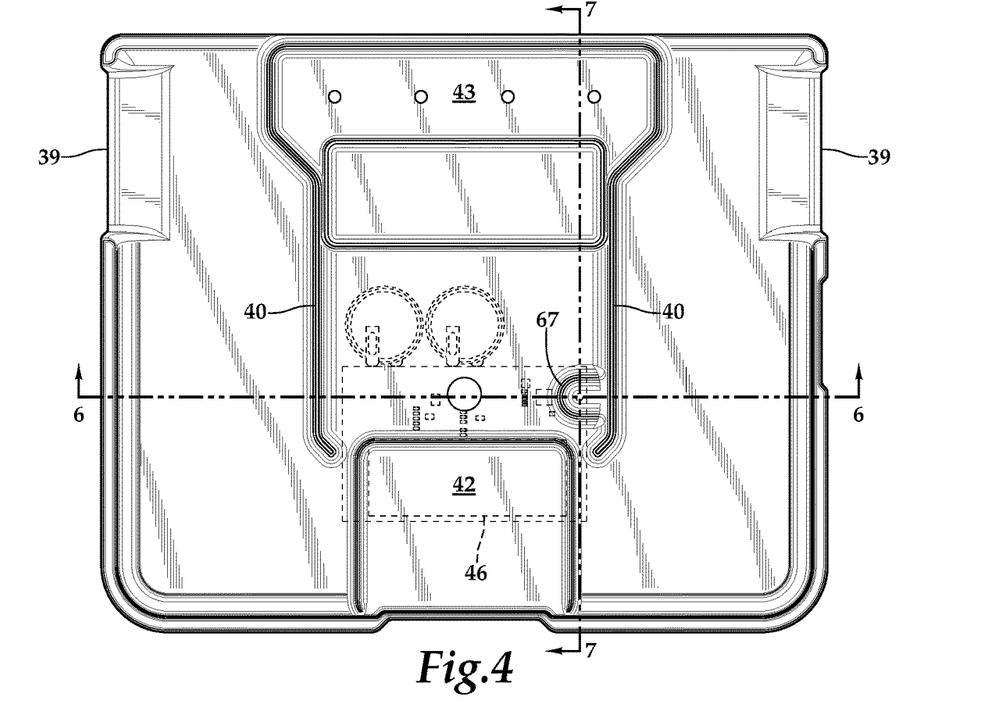
FIG. 4 is a top plan view of the bait tray of FIG. 3.
Figure 7:
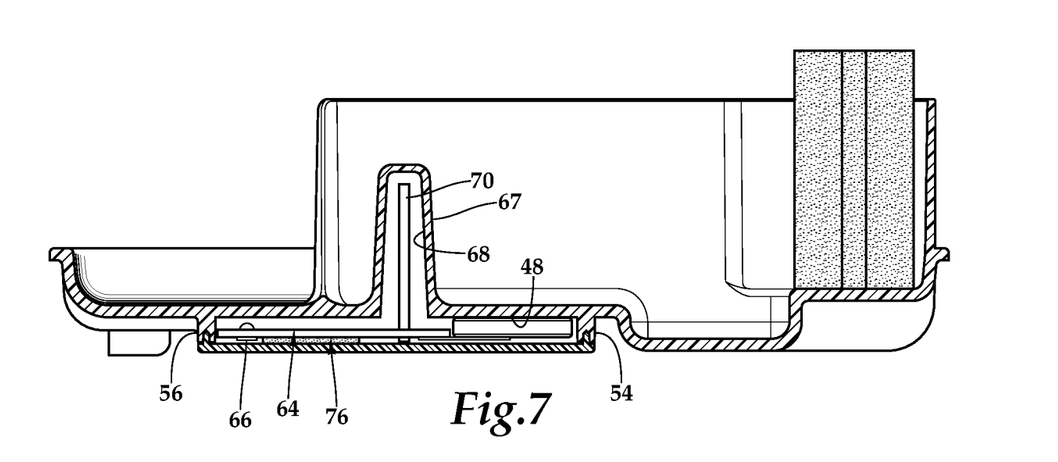
FIG. 7 is a cross-sectional view taken along section line 7-7 of FIG. 4.

Referring more particularly to FIGS. 1-10 wherein like numbers refer to similar parts, an electronic bait tray 20 is shown in FIGS. 1, 3 and 7. The bait tray 20 is installed in a bait station 22, as shown in FIG. 1. The bait tray 20 has a base 19 for supporting bait 44 and has a peripheral rim 37 which extends above the base and which substantially surrounds the base to facilitate cleaning of the bait station by removing and inverting the bait tray. The bait station 22 has a hinged lid 24 and a base 26 with a peripherical wall 27 and at least one rodent opening 28 for entrance of rodents into the bait station 22.

As shown in FIG. 2, a prior art bait tray 30 has ramps 32, one of which is visible in FIG. 2, and a feeding location 34 for rodent bait 44 such as shown in FIG. 1. The prior art bait tray 30 has two upwardly extending walls 36 which isolate the bait from the rodent openings 28, by cooperating with structures, similar to the structures 38 shown on the lid 24 in FIG. 1.

The electronic bait tray 20, best shown in FIG. 3, is distinguished by a sensor receptacle 48 and a sensor module 49 therein, and two upwardly extending walls 40 which serve similar purposes to the upwardly extending walls 36 of the prior art tray 30 shown in FIG. 2. However, the walls 40 of the inventive tray 20 are parallel, more closely spaced and adjacent, and define a narrow threshold surface 42 ahead of the walls over which a rodent must pass to gain access to the bait 44 as shown in FIG. 1. The tray is divided into an approach portion and a rodent feeding portion. The rodent entering the tray passes over one of the two ramps 39 along the approach portion. The approach portion includes a threshold surface 42 over which a rodent must pass before passing between the walls 40 and reaching a feeding portion 43 containing bait 44.

Figure 5:
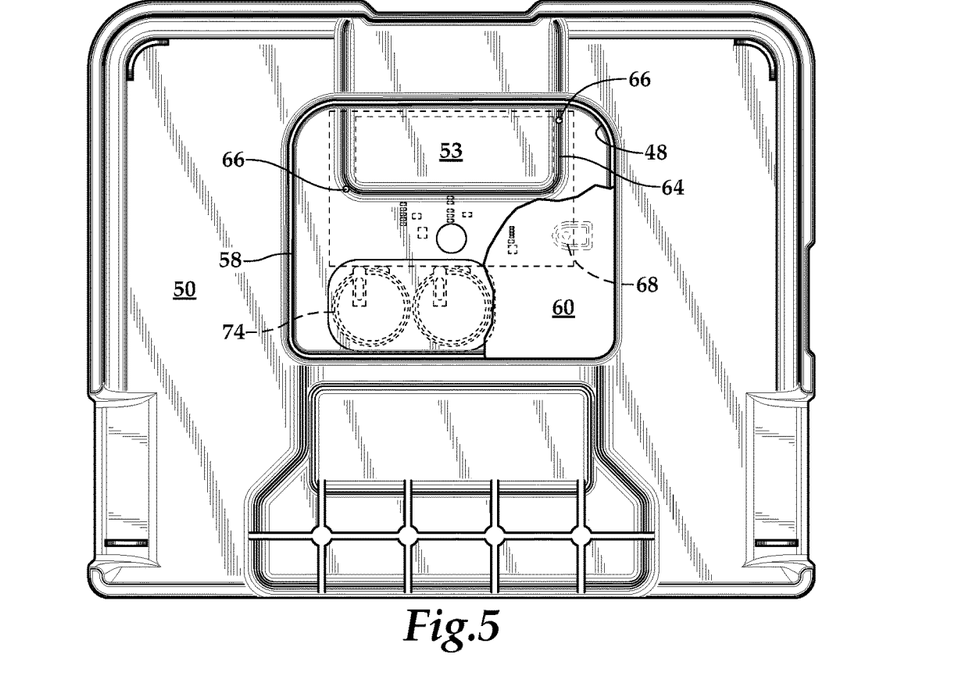
FIG. 5 is a bottom plan view of the bait tray shown in FIGS. 1 and 3, with the receptacle lid partially broken away and the sensor module shown in hidden line.
Figure 6:
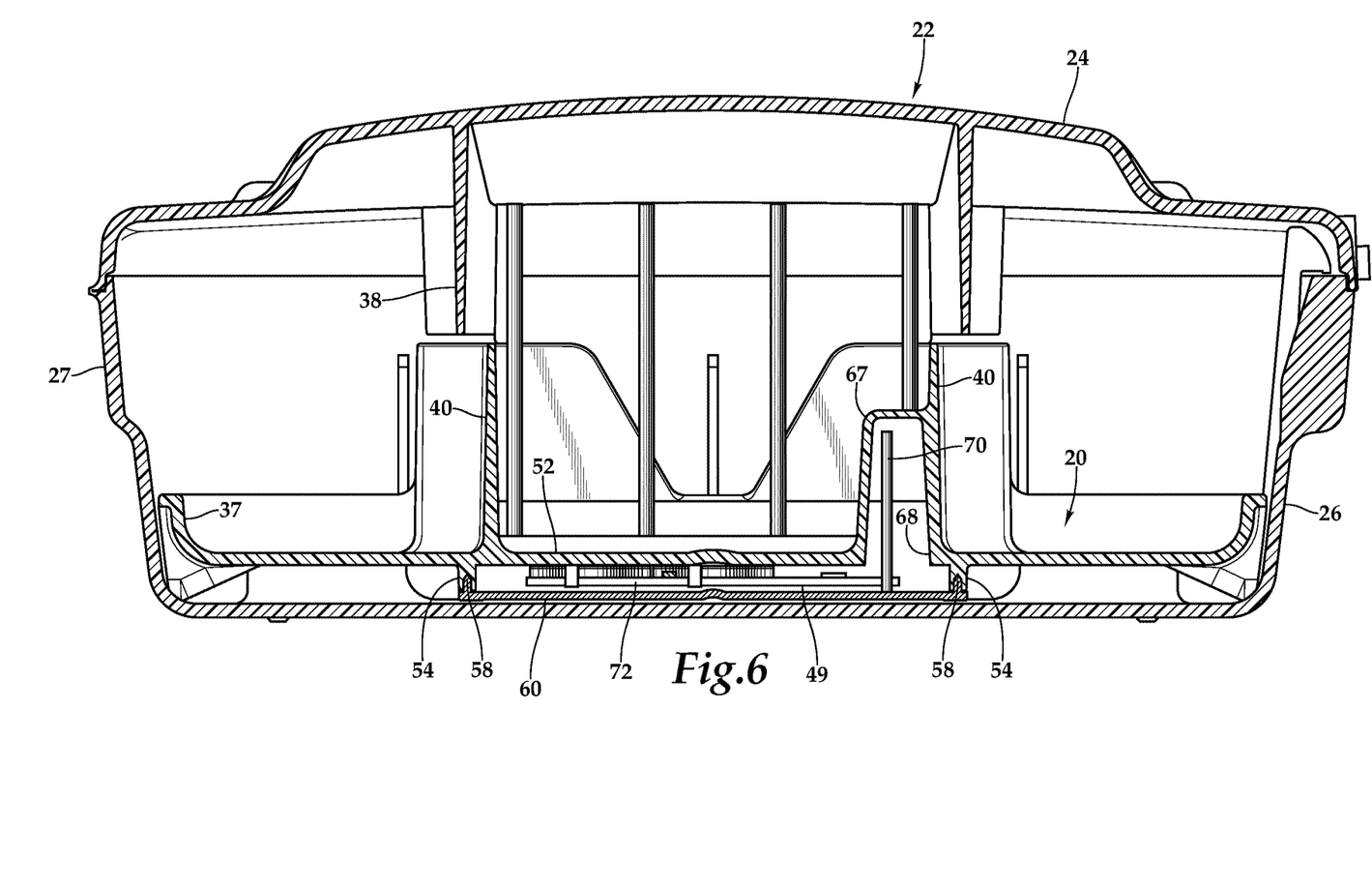
FIG. 6 is a cross-sectional view taken along section line 6-6 of the bait tray of FIG. 4 and the bait station of FIG. 1 in which section line 6-6 is perpendicular to the hinge of the bait station.

The walls 40, as shown in FIG. 3, define the passageway that a rodent must pass through to reach the bait 44, and hence must pass over the threshold surface 42 which overlies a capacitance sensor 46 which extends across the length of the threshold defined by a gap between the walls 40. The electronic bait tray 20 has a receptacle 48 as shown in FIGS. 5 and 7 which is formed on the underside 50 of the tray. The receptacle 48 is formed integral with the tray 20 and the upper portion of the receptacle is defined by the bottom wall 52 of the tray 20 which has a downwardly facing board engaging surface 53. The receptacle 48 has a downwardly extending peripheral wall 54 surrounding the bottom wall board engaging surface 53. The peripheral wall 54 extends a short distance downwardly from the bottom wall 52 and terminates in a bottom edge 56 which has a downwardly opening peripheral groove 58, best shown in FIGS. 6 and 7. A receptacle lid 60 has a tongue 62 which extends upwardly to fit in the groove 58. The lid 60 is sealed to the bottom edge 56 by ultrasonic welding. The bottom wall 52 has a downwardly protruding portion 64 which extends beneath and across the threshold surface 42 over which a rodent must travel to reach the bait, and on which the board engaging surface 53 is located. Extending from the downwardly protruding portion 64 are at least two downwardly extending pins 66 or structures which position a printed circuit board (PCB) 72, for example by extending into mating through-holes 69 in the PCB. The PCB 72 contains a capacitance sensor 46 which is engaged against the surface 53 of the bottom wall protruding portion 64. The sensor module 49 has a dipole Bluetooth antenna 70 which extends upwardly from the PCB 72. Power is supplied to the sensor module 49 by batteries such as two button CR2450 lithium primary cells 74 connected to the PCB.

The tray 20 has an upwardly extending shell 67 which may, for example, extend sidewardly from one of the tray walls 40, and which is closed to the upper surface of the tray. The shell 67 defines a downwardly opening cavity 68 which opens into the receptacle 48. The sensor module 49 antenna 70 extends from the PCB 72 upwardly into the shell 67. The tray bottom wall 52 has a slight upwardly extending depression which receives the two button CR2450 lithium primary cells 74. The PCB 72 board is supported on the bottom wall protruding portion 64 with the conductive plate 71 forming the capacitance sensor 46 pressed into engagement with the protruding portion 64 which underlies the threshold surface 42 across which a rodent must travel to access the bait 44 on the electronic bait tray 20. A portion of foam tape 76 is attached to an upwardly facing inside surface 78 of the receptacle lid 60. The foam tape 76 underlies and engages against the portion of the PCB 72 on which the conductive plate 71 forms a capacitance sensor 46. The foam tape 76 serves to push the conductive plate against the bottom wall 52 protruding portion 64 which is directly below and across the threshold surface 42 over which a rodent must travel to reach the bait 44.

It will be observed that the receptacle isolates the electronic sensor module from contact with moisture, dirt, and rodent waste which may find its way onto the tray, contributing to the continued functioning of the electronic elements of the sensor module.

Alternative Embodiment Bait Tray

Figure 8:
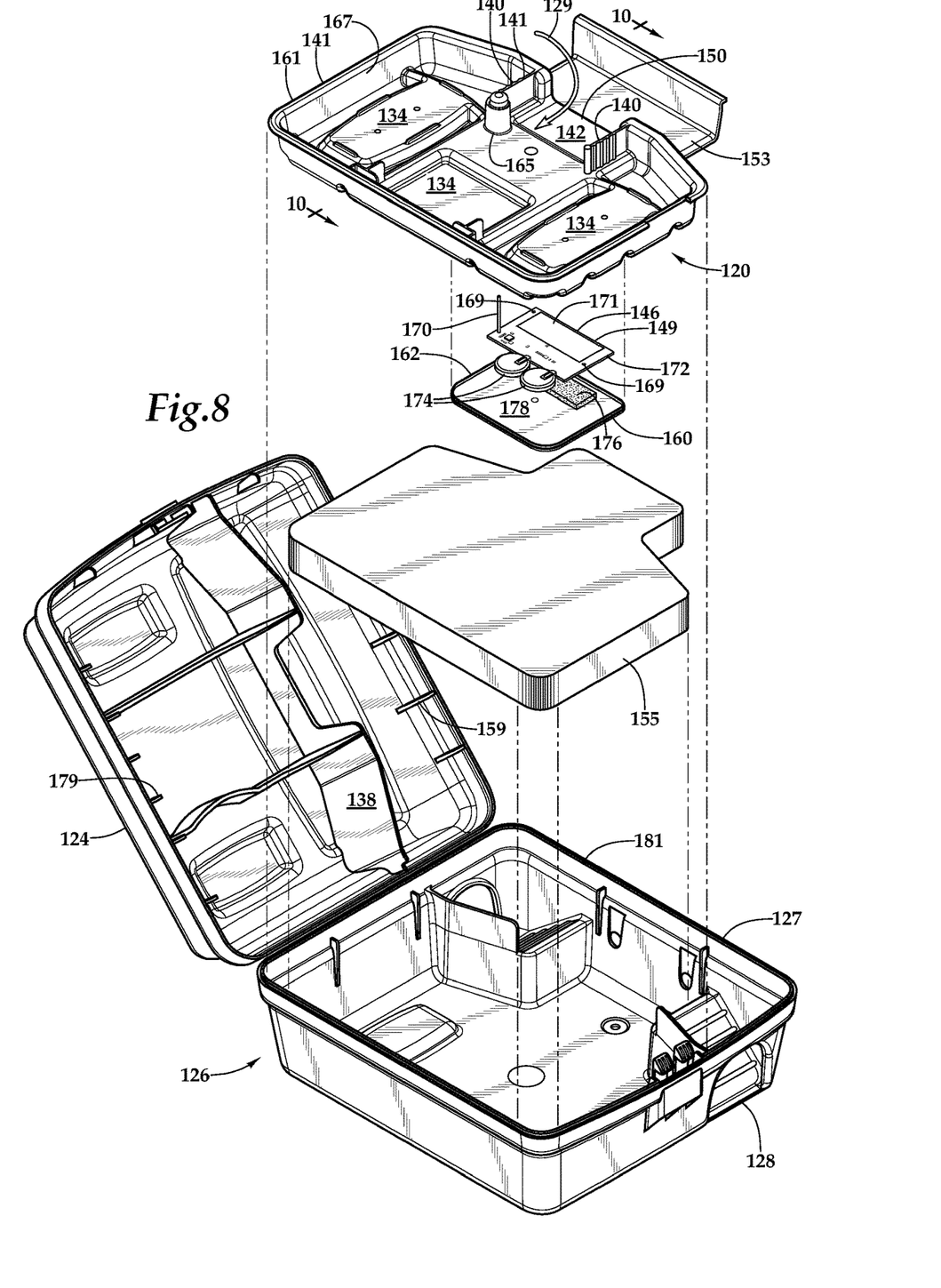
FIG. 8 is an exploded isometric view of an alternative bait station having an alternative bait station tray which incorporates an electronic module.
Figure 9:
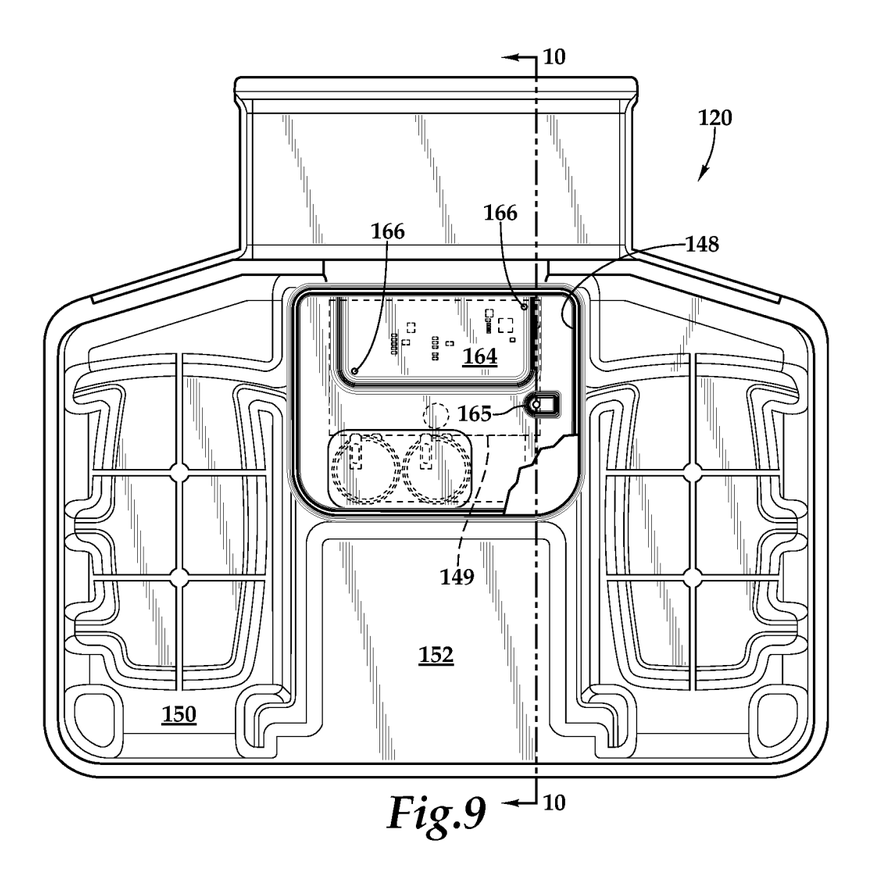
FIG. 9 is a bottom plan view of the alternative bait station tray of FIG. 8, with the receptacle lid partially broken away and the sensor module shown in hidden line.
Figure 10:
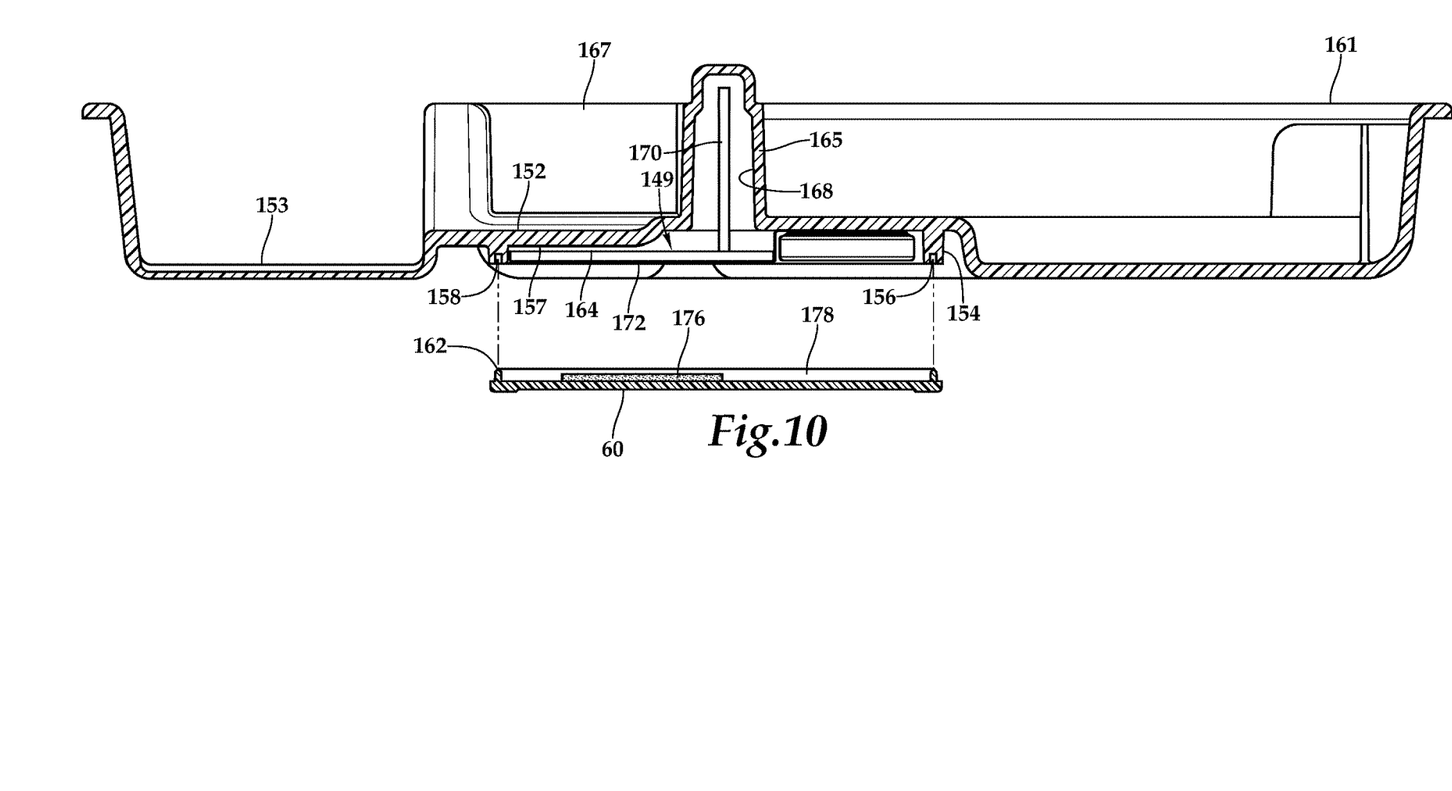
FIG. 10 is an exploded cross-sectional view of the bait station tray of FIG. 9 taken along line 10-10.

An alternative embodiment electronic bait tray 120 is shown in FIGS. 8-10. The tray 120 is similar to the bait tray described for use in the bait station described in U.S. Pat. No. 8,793,929, the disclosure of which is incorporated by reference herein, but is configured to provide detection of rodents which pass over a threshold surface 142 on the way to bait on the bait tray. The threshold surface 142 extends between two upwardly extending tray walls 140 which constrain a rodent accessing the bait within a feeding station 134 to pass over the threshold surface which overlies a capacitance sensor 146 which extends across the length of the threshold defined by a gap between the walls 140.

As shown in FIG. 8, the bait tray 120 in cooperation with a containing bait station 126 forms a constricted path 129 which path passes over the threshold surface 142 on the way to the bait location or feeding station 134 such that the rodent cannot access the bait location without traversing the threshold 142. The tray 120 forms a receptacle 148 on its underside 150 which holds a sensor module 149.

As shown in FIG. 8, the tray 120 is placed on top of a ballast weight 155. The tray 120 supports rodent traps or a plurality of bait blocks (not shown) mounted on or to the tray. The bait station 126 base 127 has portions which form ramps 151 which extend upwardly from the floor 150 of the base adjacent rodent openings 128. The ramps 151 extend upwardly to a landing 153 formed as an extension of the tray 120, wherein the ballast extends between the ramps and below the landing. The landing 153 leads to the rodent trap or the bait contained on the tray proper.

From the landing 153 an entryway into the tray 120 proper is defined between baffles 138 extending downwardly from the cover 124 and portions 141 of the tray which extend upwardly. The upwardly extending portions of the tray 141 and the downwardly extending baffle portions 138 of the cover directly engage so that when the cover with its integral baffles is closed, the cover clamps the tray in place and prevents movement of the underlying ballast weight. Smaller downwardly extending cover flanges 159 extend inwardly from the cover side walls 161 to engage portions of the tray landing 153 and similar downwardly extending flanges engage portions of the tray opposite the landing and adjacent to the cover side wall, to prevent movement of the tray and thus movement of the underlying ballast 155 weight during shipping.

As shown in FIG. 8, the tray 120 has two parts, a landing 153 which extends between the ramps 151, and a tray proper 167 which receives rodent traps and bait blocks 44 such as shown in FIG. 1. The tray 120 has a generally raised edge 161 to contain feeding debris from the bait blocks and is generally divided into two outer stations 134 designed to support bait blocks or rodent traps. The outer stations have raised platforms which provide space for structural grids underlying the platforms. The structural grids provide support for rods (not shown) which extend into rod pockets which extend into the grids.

The tray 120 rests on the tops of the ramps 151 and on eight tabs 179 arranged along the bait station base side wall 181. The tray 120 thus need not be supported by the ballast weight 155 over which it extends. Two tabs 179 extend outwardly of each segment wall 181 to support the tray 120 in its proper position with respect to the base 126 and the ramps 151, even if the bait station is used without the ballast weight 155.

As shown in FIGS. 9 and 10 the electronic bait tray 120 has a receptacle 148 which is formed on the underside 150 of the tray 120 beneath a tray bottom wall 152. The receptacle 148 is formed integral with the tray 120. A peripheral wall 154 extends downwardly from the bottom wall and surrounds the upper surface 157 of the receptacle. The peripheral wall 154 extends a short distance downwardly from the bottom wall 152 and terminates in a bottom edge 156. The peripheral wall has a downwardly opening groove 158 best shown in FIGS. 9 and 10. A receptacle lid 160 has a peripheral upwardly extending tongue 162 which fits in the groove 158 and is sealed to the peripheral wall by ultrasonic welding. The bottom wall 152 has a downwardly protruding portion 164 which extends beneath and across the overlying threshold surface 142 over which a rodent must travel to reach the bait. Extending from the protruding portion 164 are at least two downwardly extending pins 166 or positioning structures which position a PCB 172 on which the capacitance sensor 146 is formed against the bottom wall protruding portion 164. The PCB may have mating through-holes 169 which receive the pins 166. A dipole Bluetooth antenna 170 extends from the PCB 172 of the sensor module 149, and power is provided by a power source or battery such as two button CR2450 lithium primary cells 174.

The tray 120 has an upwardly extending shell 165 which may, for example, extend from one of the tray walls 140, and which is closed to the upper surface of the tray. The shell 165 defines a downwardly opening cavity 168 which opens into the receptacle 148. The sensor module 149 antenna 170 extends from the PCB 172 upwardly into the shell 165.

The bottom wall 152 has a cavity 168 for receiving the dipole Bluetooth antenna 170 and a slight depression where the two button CR2450 lithium primary cells 174 are positioned. The PCB 172 board is supported on the bottom wall protruding portion 164 with the conductive plate 171 forming the capacitance sensor 146 pressed into engagement with the protruding portion 164 which underlies the threshold surface 142 across which a rodent must travel to access the bait 44 on the electronic bait tray 120.

A portion of foam tape 176 is attached to an upwardly facing inside surface 178 of the receptacle lid 160. The foam tape 176 underlies and engages against the portion of the PCB 172 on which the conductive plate 171 forms a capacitance sensor 146. The foam tape 76 serves to push the conductive plate against the bottom wall 52 protruding portion 64 which is directly below and across the threshold surface 142 over which a rodent must travel to reach the bait.

It should be understood that the sensor module is not used as a generic or a nonce term. Applicant has disclosed a particular sensor module but the term includes any device incorporating: a power source, a radio transceiver, and a sensor which can detect a rodent passing over a threshold on a bait tray, connected together to transmit a signal that a rodent has passed over the threshold. Although a capacitance sensor is shown and described, other sensors may be used which can detect through a portion of the bait tray such as seismic, shock, sonic, ultrasonic, and electromagnetic including radio frequency radar.

It is understood that the invention is not limited to the particular construction and arrangement of parts herein illustrated and described but embraces all such modified forms thereof as come within the scope of the following claims.

We claim:

1. A bait tray for use in a bait station, comprising:
   a base for supporting bait with a peripheral rim which extends above the base and which substantially surrounds the base to facilitate cleaning of the bait station by removing and inverting the bait tray;
   wherein the bait tray has at least one upwardly extending wall arranged to cooperate with at least one baffle extending downwardly from a bait station cover to divide the bait tray into an approach portion with a threshold and a portion for containing the bait which is accessible by a rodent only by passing over the threshold;
   a receptacle formed integral with the bait tray positioned below the threshold, and having a bottom wall which forms a portion of the receptacle, and a peripheral wall extends downward from the bottom wall which terminates in a bottom edge; and
   a lid positioned beneath the peripheral wall, wherein the lid and the bottom wall have mating structure which engage with one another such that the lid is sealed to the bait tray.

2. The bait tray of claim 1 wherein portions of the base form at least one entry ramp to the approach portion.

3. The bait tray of claim 1 wherein the bottom wall has a protruding portion which extends beneath and across the threshold and wherein at least two protruding pins or positioning structures extend downwardly from the bottom wall which are arranged to position a printed circuit board and a capacitance sensor formed thereon against the bottom wall protruding portion.

4. The bait tray of claim 3 wherein the receptacle lid has a portion of foam tape attached to an inside surface of the lid which underlies the protruding portion so as to push a conductive plate on a printed circuit board against the bottom wall which is directly below and across the threshold.

5. The bait tray of claim 1 wherein the bottom wall has a downwardly opening cavity for receiving a dipole Bluetooth antenna which extends from a sensor module.

6. The bait tray of claim 1 further comprising a sensor module contained within the receptacle, the sensor module having a capacitance sensor which is positioned beneath the threshold to detect rodents passing thereover.

7. A bait tray for use in a bait station, comprising:
   a base for supporting bait with a peripheral rim which extends above the base and which substantially surrounds the base to facilitate cleaning of the bait station by removing and inverting the bait tray;
   wherein the bait tray has at least one upwardly extending wall arranged to cooperate with at least one baffle extending downwardly from a bait station cover to divide the bait tray into an approach portion with a threshold and a portion for containing the bait which is accessible by a rodent only by passing over the threshold; and
   a receptacle formed integral with the bait tray positioned below the threshold, and having a lid sealed to the bait tray, wherein the bait tray has a bottom wall which forms a portion of the receptacle, and a peripheral wall extending downward from the bottom wall which terminates in a bottom edge, the peripheral wall having a downwardly opening groove.

8. The bait tray of claim 7 wherein the receptacle lid has a tongue which fits in the downwardly opening groove and is sealed to the bottom edge by a welding.

9. The bait tray of claim 7 wherein the receptacle lid has a tongue which fits in the downwardly opening groove and is sealed to the bottom edge.

10. A bait station comprising:
    a base having a floor and a peripheral wall, and portions of the peripheral wall which define at least one rodent access opening;
    a cover which closes over the base to define an interior volume;
    a tray within the interior volume and positioned above the floor;
    wherein the tray has at least one upwardly extending wall which cooperates with at least one baffle extending downwardly from the cover to divide the tray into an approach portion having a threshold and a feeding portion for containing bait, wherein the feeding portion is accessible by a rodent from the at least one rodent access opening only by passing over the threshold on the tray;
    a downwardly opening receptacle formed integrally with the tray and positioned below the threshold, the receptacle being surrounded by a downwardly extending peripheral wall having a bottom edge and a downwardly facing portion;
    a lid positioned beneath the downwardly extending peripheral wall, wherein the lid and the downwardly extending peripheral wall have a groove on one and a tongue on the other extending into the groove with the lid sealed to the tray.

11. The bait station of claim 10 wherein the tray further comprises a sensor module contained within the receptacle.

12. The bait station of claim 11 wherein the sensor module has a capacitance sensor which is positioned beneath the threshold to detect rodents passing thereover.

13. The bait station of claim 10 wherein the tray has a bottom wall which forms a part of the receptacle, and the bottom wall has a protruding portion which extends beneath and across the threshold and wherein at least two protruding pins or positioning structures extend downwardly from the bottom wall which are arranged to position a printed circuit board and a capacitance sensor formed thereon against the bottom wall protruding portion.

14. The bait station of claim 10 wherein the tray has a bottom wall which forms a part of the receptacle, and the bottom wall has a downwardly opening cavity for receiving a dipole Bluetooth antenna which extends from a sensor module.

15. A bait station comprising:
    a base having a floor and a peripheral wall, and portions of the peripheral wall which define at least one rodent access opening;
    a cover which closes over the base to define an interior volume;
    a tray within the interior volume and positioned above the floor;
    wherein the tray has at least one upwardly extending wall which cooperates with at least one baffle extending downwardly from the cover to divide the tray into an approach portion having a threshold and a feeding portion for containing bait, wherein the feeding portion is accessible by a rodent from the at least one rodent access opening only by passing over the threshold on the tray; and a receptacle formed integrally with the tray and positioned below the threshold, and having a lid sealed to the tray, wherein the tray has a bottom wall which forms a portion of the receptacle, and a peripheral wall extending downward from the bottom wall which terminates in a bottom edge, the peripheral wall having a downwardly opening groove.

16. The bait station of claim 15 wherein the receptacle lid has a tongue which fits in the downwardly opening groove and is sealed to the bottom edge by a welding.

17. The bait station of claim 15 wherein the tray further comprises a sensor module contained within the receptacle; and wherein the receptacle lid has a portion of foam tape attached to an inside surface of the lid which engages against the sensor module to urge said sensor module against the bottom wall which is directly below and across the threshold.

18. The bait station of claim 15 wherein the receptacle lid has a tongue which fits in the downwardly opening groove and is sealed to the bottom edge.

19. The bait station of claim 15 wherein the tray bottom wall has a protruding portion which extends beneath and across the threshold and wherein at least two protruding pins or positioning structures extend downwardly from the bottom wall which are arranged to position a printed circuit board and a capacitance sensor formed thereon against the bottom wall protruding portion.

20. The bait station of claim 15 wherein the bottom wall has a downwardly opening cavity for receiving a dipole Bluetooth antenna which extends from a sensor module.

* * * * *